Jan. 13, 1970
R. E. DIGGS
3,489,352
FLUID DRIVEN PRIME MOVER
Filed Feb. 15, 1968
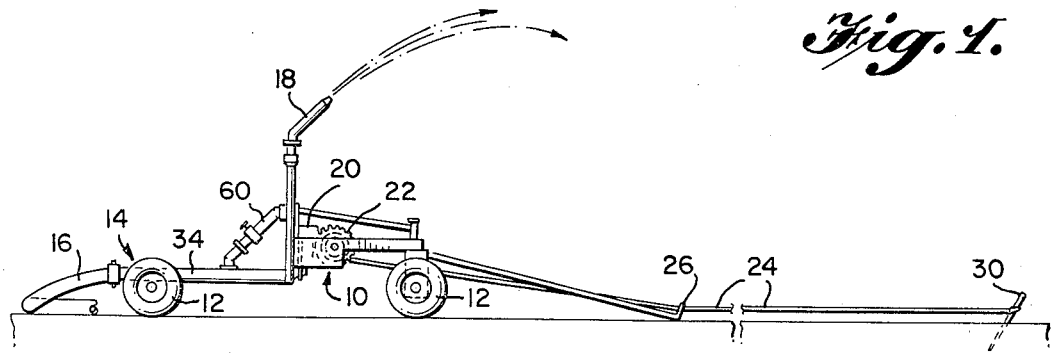
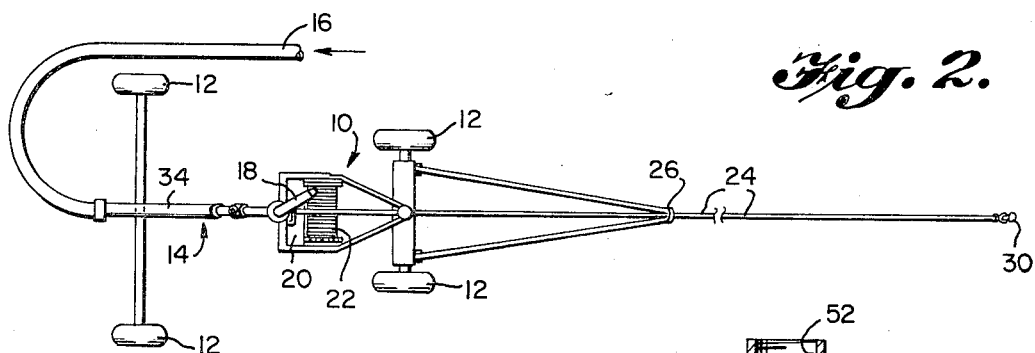
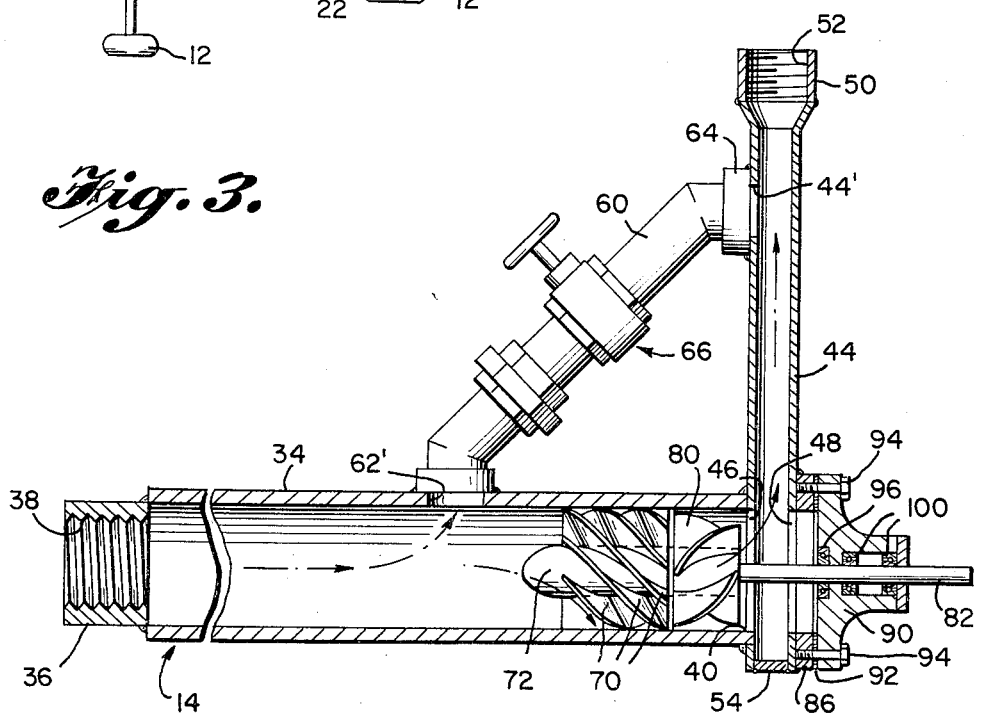
INVENTOR
RICHARD E. DIGGS
BY *Shoemaker and Mattare*
ATTORNEYS

United States Patent Office 3,489,352
Patented Jan. 13, 1970

3,489,352
FLUID DRIVEN PRIME MOVER
Richard E. Diggs, 210 N. River St., P.O. Box 588,
Carthage, Mo. 64836
Filed Feb. 15, 1968, Ser. No. 705,851
Int. Cl. F02c 7/22
U.S. Cl. 239—189                    12 Claims

ABSTRACT OF THE DISCLOSURE

A body means has an inlet means and an outlet means, and a fluid driven turbine means is mounted between the inlet and outlet means. An output shaft is connected with the turbine means and extends outwardly of the body means for connection to a driven member. Vanes are provided adjacent the turbine means for imparting spin to the fluid to drive the turbine means, and means is provided adjacent the vanes for increasing the velocity and torque of the fluid. A bypass conduit has a valve means connected therein for controlling the speed of the output shaft. The outlet means may be connected with the sprinkler of an irrigation means, the output shaft being connected for causing movement of the irrigation means.

BACKGROUND OF THE INVENTION

The present invention relates to a fluid driven prime mover which may be employed for driving various driven members where a source of fluid under pressure is readily available. The prime mover of the present invention is particularly useful for propelling continuously moving irrigation systems, for example. The apparatus may also be used in the petroleum industry and other applications as will occur to one skilled in the art.

A problem has long existed in the irrigation field to provide suitable power for moving an irrigation system over a field. Hose fed giant sprinklers, boom sprinklers, elevated straight-line and pivot feed elevated circular irrigation systems require continuous propulsion means, and it is a particular object of the present invention to provide a solution to this long-standing problem.

A principal objective of the present invention is to enable automation of irrigation systems and the saving of substantial amounts of labor, time and water now wasted by most existing manual irrigation systems.

SUMMARY OF THE INVENTION

The present invention provides a prime mover of very simplified construction which may be readily controlled. This prime mover is especially useful in conjunction with continuously propelled large automated irrigation systems.

The prime mover of the present invention is readily adaptable for actuating various types of automated self-propelled continuous moving irrigation systems. When interconnected with an irrigation system, the apparatus is fully automatic in its operation since the prime mover will be started and stopped automatically without secondary controls when the water is flowing or stopped in the irrigation system. No secondary outside power source is necessary in addition to the flowing irrigation water itself.

The prime mover of the present invention may be manufactured at a minimum cost and provides an exceptionally high degree of reliability with a minimum of maintenance and surveillance.

The prime mover of the present invention has outstanding efficiency at all ranges of power and speed. Infinitely variable speed may be readily obtained with the control means of the present invention, and this is especially important in irrigation systems since varying the speed of travel of the sprinkler means of the system is apparently the only suitable method of controlling the amount of water applied in an automated continuously moving system.

When employed with an irrigation system, the prime mover of the present invention does not use and expel any part of the irrigation water directly on the ground in order to develop its power thereby preventing any excessively wet areas in the fields being irrigated.

BRIEF DESCRIPTION OF THE DRAWING

FIG. 1 is a somewhat schematic front view of a portion of an irrigation system employing the prime mover of the present invention;

FIG. 2 is a top view of a structure shown in FIG. 1; and

FIG. 3 is a vertical section taken through the prime mover of the present invention.

DESCRIPTION OF THE PREFERRED EMBODIMENT

Referring now to the drawing wherein like reference characters designate the corresponding parts throughout the several views, a portion of a continuously moving irrigation system is shown in FIG. 1 and 2. As seen in these figures, a framework 10 is movably supported by wheels 12. The framework supports a body means 14 having an inlet means hereinafter described which is interconnected with a main line or flexible hose 16 which in turn is connected with a suitable source of fluid under pressure such as a water main or the like.

The outlet means of the body means as hereinafter described is interconnected with a conventional sprinkler 18 which serves as a water distribution means in a well known manner. The output shaft of the prime mover hereinafter described is connected with a gear reduction unit 20 which in turn is interconnected with a drum 22 adapted to wind a cable 24 thereon.

The cable 24 extends through a guide tongue 26, one end of the cable being fixed to a member such as a stake 30, the opposite end of the cable being fixed to the drum 22.

During operation of the irrigation system, water passing through the hose 16 is discharged through the sprinkler 18, and as the water moves through the prime mover of the unit which is incorporated in the body means 14, the drum 22 is driven so as to wind up the cable thereon thereby moving the framework and the sprinkler mounted on the framework along the field.

Referring now to FIG. 3 of the drawings, body means 14 includes a first tubular portion 34 having an attaching end portion 36 including internal threads 38 formed thereon for attachment to a flexible hose and the like.

The opposite open end 40 of tubular member 34 opens into the lower end of a second tubular member 44 which extends at generally right angles to the first-mentioned tubular member 34 and is rigidly affixed thereto as by welding or the like. Tubular member 44 has a pair of aligned holes 46 and 48 formed therethrough which permits insertion of the turbine means hereinafter described. In a typical example, the tubular member 34 may be of generally circular cross section, while the tubular member 44 may be of generally rectangular cross sectional configuration.

The upper end 50 of tubular member 44 is enlarged and has internal threads 52 formed therein for connection to a sprinkler or the like. The lower end of tubular member 44 is closed off with a plug portion 54 suitably held in place as by welding or the like.

A bypass conduit means 60 has a first end portion 62 thereof interconnected as by welding with tubular member 34 and providing communication through the hole 62' in the tubular portion 34 between the interior of this tubular portion and the bypass conduit means. The opposite end 64 of the bypass conduit means is connected as by welding with the tubular member 44 and a hole 44' formed in the wall of tubular member 44 provides communication between the bypass conduit means and the tubular member 44.

A manually operable valve means 66 is provided at an intermediate point in the bypass conduit means so as to enable selective control of the amount of fluid which flows through the bypass conduit means during operation of the apparatus.

Fluid diverting means is provided in the form of a plurality of vanes 70 secured in place within the tubular member 34. In a typical example, these directional vanes may be mounted at a 45-degree pitch so as to impart a suitable spin to the fluid passing therethrough so as to properly operate with the turbine means hereinafter described.

A body member 72 which tapers to the left as seen in FIG. 3 is mounted at the central portion of tubular member 34 and adjacent to the vanes 70. This body member 72 services to increase the velocity and torque of the fluid passing through the vanes to thereby enhance the driving effect of the fluid on the turbine means.

A turbine wheel or member 80 is connected with one end of a driven or output shaft 82, the turbine means being supported adjacent the outlet of the vanes 70 and within the open end portion 40 of the tubular member 34. It is apparent that fluid leaving the vanes 70 will impinge upon the turbine means and cause rotation thereof thereby rotating the output shaft 82.

A mounting member 86 is secured as by welding to the tubular member 44, and a bearing housing 90 is disposed adjacent the mounting member 86 with a gasket 92 interposed therebetween, the bearing housing 90 being supported in operative position by a plurality of cap screws 94 extending through suitable holes provided in housing 90 and being threaded into suitable drilled and tapped holes provided in member 86.

A rotary shaft seal 96 is supported by housing 90 in surrounding relationship to a driven shaft 82. Suitable conventional bearing means 100 is also supported by housing 90 and serves to rotatably journal the output shaft 82 as illustrated, it being noted that the right-hand end of the output shaft as seen in FIG. 3 extends outwardly of the body means.

During operation of the apparatus, fluid under pressure enters tubular member 34 through the inlet portion 36. The vanes 70 impart a useful spin to the fluid which is directed toward the turbine wheel 80 which in turn causes rotation of the turbine wheel and the attached output shaft 82. The fluid then passes upwardly through tubular member 44 as seen in FIG. 3 and out through the outlet portion 52 and an attached sprinkler or the like.

The speed and power applied to the output shaft may be adjusted by the control means including the manually operable valve means 66. It is apparent that when the valve means 66 is closed, all of the fluid will pass through the turbine wheel thereby developing maximum speed and output power at the output shaft. On the other hand, when the valve means 66 is open all the way, a minimum amount of speed and power will be developed at the output shaft as the fluid bypasses the turbine wheel through the bypass conduit means.

The control means including the bypass conduit means and the valve means connected therein provides a quick, positive and infinite speed control of the output shaft. This arrangement is of course particularly useful in a continuously moving irrigation apparatus.

As this invention may be embodied in several forms without departing from the spirit or essential characteristics thereof, the present embodiment is therefore illustrative and not restrictive.

I claim:

1. A fluid driven prime mover comprising a frame means; said frame means supporting a hollow, fluid conveying body means; said body means comprising a fluid conveying first tubular portion having inlet means at one end thereof for connection to a fluid source, and a second fluid conveying tubular portion connected to the other end of said first tubular portion, one end of said second tubular portion having outlet means connected to fluid distribution means; driven means including a fluid driven portion within said body means between said inlet means and said outlet means; an output shaft connected with said fluid driven portion and extending out of said body means for connection to a driven member; and control means for controlling movement of said driven means.

2. A fluid driven prime mover as defined in claim 1 wherein said fluid driven portion comprises a fluid turbine means.

3. A fluid driven prime mover as in claim 2 wherein said turbine means comprises an axial flow fluid velocity driven turbine, said axial flow turbine being mounted in said other end of said first tubular portion, and said output shaft extending through said second tubular portion.

4. A fluid driven prime mover as in claim 3 wherein said second tubular portion is connected adjacent its other end to said other end of said first tubular portion in substantially right angular relationship, and said output shaft extends laterally through said second tubular portion other end.

5. A fluid driven prime mover as in claim 4 wherein said control means comprises a bypass conduit connected between and intermediate the ends of said first and second tubular portions and is in parallel fluid flow relationship to said axial flow turbine.

6. A fluid driven prime mover as in claim 5 wherein said control means further includes selectively operable valve means in said bypass conduit for infinitely adjusting and controlling flow through said bypass and said turbine to regulate turbine speed and torque while at the same time affording substantially constant and full flow to said fluid distribution means.

7. A fluid driven prime mover as in claim 6 wherein said fluid driven portion further includes a drum connected to said output shaft, a cable wound on said drum, said cable being immovably connected at one end remote from said irrigator so that as said drum is turned by said turbine said cable is wound thereon and the irrigator is moved.

8. A fluid driven mover as defined in claim 1 including fluid directing means for directing fluid into said fluid driven portion.

9. A fluid driven prime mover as defined in claim 8 wherein said fluid directing means includes vane means disposed obliquely to the path of fluid flow through the body means so as to impart spin to the fluid flowing therethrough.

10. A fluid driven prime mov as defined in claim 9 including velocity and torque increasing means disposed adjacent said vane means.

11. A fluid driven prime mover as defined in claim 1 including a readily removable portion for supporting said output shaft and for permitting ready mounting and removal of said fluid driven portion in said body means.

12. A fluid driven prime mover as defined in claim 1 wherein said fluid driven prime mover includes irrigation means and said fluid distribution means includes rotary means connected to said output shaft for causing movement of said irrigation means to provide a self-propelled continuously moving automated irrigation means for large scale field watering.

References Cited

UNITED STATES PATENTS

| | | | |
|---|---|---|---|
| 23,131 | 3/1859 | Von Schmidt | 253—148 |
| 485,532 | 11/1892 | Crepeau | 239—191 |
| 2,958,470 | 11/1960 | Giwosky | 239—191 X |
| 3,175,770 | 3/1965 | Johnson | 239—189 |

FOREIGN PATENTS 541,886  5/1922  France.

SAMUEL F. COLEMAN, Primary Examiner

U.S. Cl. X.R.

253—31